Aug. 11, 1936. A. P. THOMS ET AL 2,050,510
CABLE SADDLE
Filed May 3, 1933
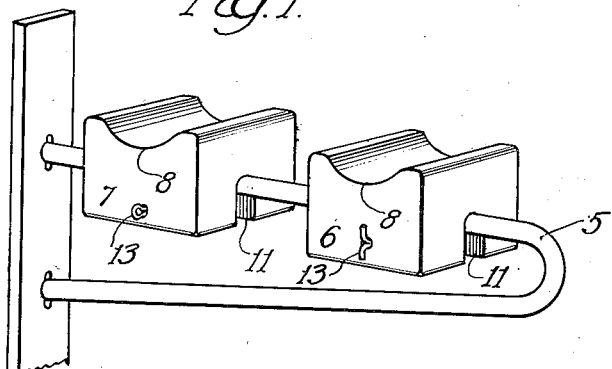
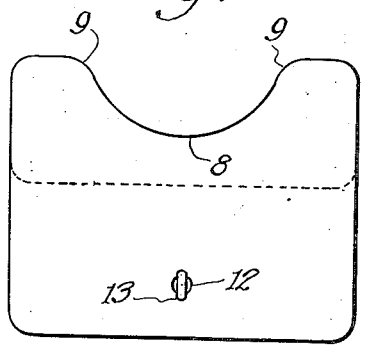
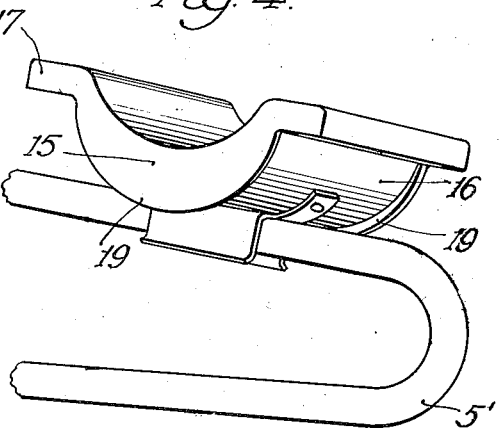
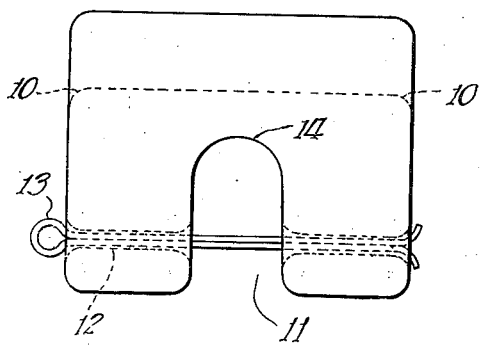
Inventors:
Carl A. Keller
Alexander P. Thoms Patented Aug. 11, 1936

2,050,510

UNITED STATES PATENT OFFICE 2,050,510

CABLE SADDLE

Alexander P. Thoms and Carl A. Keller, Chicago, Ill.

Application May 3, 1933, Serial No. 669,096

5 Claims. (Cl. 173—321)

Our invention relates to cable racks or brackets and has for its principal object the provision of a bracket and saddle therefor which permits ready and free adjustment of the saddle on the bracket or rack to accommodate the expansion and contraction of the cable and the variable positioning of the cable encountered in installation thereof.

A cable for conducting electric current expands and contracts as it takes on load or is relieved of load and most of this expansion and contraction is taken up in the manhole because of the tight fit of the cable in the ducts between manholes. The cable racks curve in the manholes to allow this movement. With stationary or sticking saddles the cables will often actually move off the saddles. With this device the saddle moves and takes the wear thus protecting the cable which if it failed due to wear would cost many times the value of the cable racks.

In some cases insulation is necessary as in case of single conductor three phase installations. In other cases care must be taken to ground the cable sheath. Our invention contemplates a structure which permits the necessary movement of the cable by a rotating and sliding of the saddle with the cable on the bracket and which is well adapted to either insulated cable or grounded cable installations.

It is also a purpose of this invention to provide in conjunction with the cable racks a novel saddle which is both insulating and non-corrosive so that the tendency for the saddle to stick upon the rack and thus prevent adjustment is substantially overcome.

We will describe the preferred form of our invention by reference to the accompanying drawing wherein—

Fig. 1 is a perspective showing a portion of the rack with the saddle thereon;

Fig. 2 is an elevation of the saddle looking in the direction in which the cable extends;

Fig. 3 is an elevation of the saddle at right angles to Fig. 2;

Fig. 4 is a perspective of a modified form of saddle.

Referring now in detail to the drawing, the rack 5 is preferably of a construction shown for example in the patent to Brachtl No. 1,335,553, issued March 30, 1920. This rack has mounted thereon the saddle such as 6 and 7 which are identical in structure. These saddles are preferably constructed of porcelain or soapstone or other suitable insulating material and are provided as shown on the top thereof with a wide shallow groove 8 to receive the cable, this groove being rounded as indicated at 9 and 10 so as to present no sharp edges that would tend to injure the sheathing on the cable. The saddle blocks are substantially rectangular in shape and on the side opposite the cable receiving groove a deep groove 11 extending well past the center line of the block serves as a means of mounting the saddle upon the rack. This deep groove enables the saddle to be positioned on the rack in upright position so that it will tend to stay upright and not tip over. Furthermore this construction permits of placing insulation on racks where cables are already in place and avoids necessity of removing the racks. The block is apertured as indicated at 12 to receive the locking pin 13.

From an examination of Fig. 1, it is believed to be evident that the saddle block and the cable thereon are so mounted on the rack as to provide a substantially universal adjustment of the cable and saddle on the rack. The saddle may be moved endwise on the rack to any position, and, as it is pivoted on the rack by the rounded top surface 14 of the groove 11, it may turn with the cable with perfect freedom.

The insulating material fitting upon the rack, which is preferably galvanized, will not rust or corrode and thus stick in place. There being no clamping action involved, it is apparent that free adjustment both lengthwise of the rack and around the rack is readily obtained.

In the form shown in Fig. 4, we have merely adapted a porcelain protector 15 to a metal saddle 16 which metal saddle is free to rotate or slide on the rack. While this gives the insulation feature and also protects the cable against cutting of its covering, it is not as satisfactory as the form shown in Figs. 1 to 3. This protector 15 has the extended end portions 17 and 18 which cover the ends of the metal saddle and is flanged at the side edges as indicated at 19 so as to hold it against endwise movement on the saddle 16.

From the above description, it is believed that the construction and advantages of this device will be clear to those skilled in this art.

Having thus described our invention, what we claim as new and desire to secure by Letters Patent is:

1. The combination with a cable rack having an arm, of a saddle consisting of an insulating block, said block having a wide shallow cable receiving groove in one face thereof and having means formed in the block opposite said cable receiving groove rotatably and slidably seating the saddle upon the cable rack arm, said last-named means embracing half of the periphery of said arm and projecting therebelow.

2. The combination with a cable rack having an arm, of a saddle consisting of an insulating block, said block having a wide shallow cable receiving groove in one face thereof and having a narrow deep groove in the face opposite said cable receiving groove rotatably and slidably seating the saddle upon the cable rack arm, said narrow groove extending more than half way through the block whereby the center of gravity of said block is disposed below the supporting surface of said arm.

3. A cable rack having an arm and having seated thereon a cable receiving saddle, said saddle having an insulating seat for the cable and having U-shaped means opposite said seat for slidably and rotatably receiving the cable arm, said U-shaped means extending below said arm to dispose the center of gravity of said saddle below the top of said arm.

4. In combination, a cylindrical cable rack arm, a cable saddle for mounting a cable on said cylindrical cable rack arm and having a shallow groove in one surface thereof, a relatively deep groove in the opposite surface thereof receiving said cable arm, the defining portions of said groove extending below said arm, and means extending transversely across said last named defining portions below said arm for preventing displacement of said saddle from said arm.

5. The combination with a cylindrical cable rack arm, of a cable saddle for supporting a cable thereon comprising a substantially square insulating block having opposed round bottom grooves formed in the top and bottom surfaces of said block, one of said grooves extending substantially half way through said block and of a width substantially equal to the diameter of said arm and adapted to receive said arm therein, the defining walls of said groove extending below said arm, means extending transversely across said groove between said defining walls to lock said saddle on said arm, and the other of said grooves extending substantially less than one-third of the distance through said block and extending over substantially more than half of the upper surface of said block.

CARL A. KELLER.
ALEXANDER P. THOMS.